United States Patent [19]

St John

[11] Patent Number: 5,988,419
[45] Date of Patent: Nov. 23, 1999

[54] GLASS CONTAINER WITH HANDLE STRUCTURE

[75] Inventor: Robert A. St John, Cheshire, Conn.

[73] Assignee: HP Intellectual Corp., Wilmington, Del.

[21] Appl. No.: 09/058,219

[22] Filed: Apr. 10, 1998

[51] Int. Cl.⁶ .............................. B65D 1/10; B65D 23/10
[52] U.S. Cl. .................... 215/398; 215/396; 220/753; 220/759
[58] Field of Search ...................... 215/382, 396, 215/398; 220/759, 753

[56] References Cited

U.S. PATENT DOCUMENTS

| | | | |
|---|---|---|---|
| 420,917 | 2/1890 | McIntire | 220/759 X |
| 1,637,853 | 8/1927 | Brown. | |
| 1,730,820 | 10/1929 | Holden. | |
| 2,114,260 | 4/1938 | Von Nessen | 215/396 |
| 2,424,045 | 7/1947 | Millstein | 215/382 X |
| 2,609,563 | 9/1952 | Budelman | 16/114 |
| 2,610,081 | 9/1952 | Bushman | 215/396 X |
| 2,815,527 | 12/1957 | Hollaway et al. | 16/116 |
| 3,813,729 | 6/1974 | Szabo et al. | 16/119 |
| 4,366,596 | 1/1983 | Hellinger et al. | 16/119 |
| 5,025,939 | 6/1991 | Bunn et al. | 215/398 |
| 5,216,780 | 6/1993 | Lutzke et al. | 16/111 R |
| 5,586,682 | 12/1996 | Yeh | 220/759 X |
| 5,771,536 | 6/1998 | Sieg et al. | 220/759 X |
| 5,867,867 | 2/1999 | Kessler | 220/753 X |

*Primary Examiner*—Sue A. Weaver
*Attorney, Agent, or Firm*—Barry E. Deutsch

[57] ABSTRACT

A glass container 30 includes a container portion 34 and a handle 44. The container portion 34 is formed with a base floor 36, a side wall 38 and an opening 40 surrounded by an edge 42 which is formed with a pouring lip 46. The handle 44 is formed by two shell sections 52 and 54 which are assembled and secured, mechanically and adhesively, about a glass support 48 which is formed integrally with the glass container portion 34. A soft, non-slip attachment 110 is secured to an inboard side of the exterior of the handle 44.

9 Claims, 4 Drawing Sheets

GLASS CONTAINER WITH HANDLE STRUCTURE

BACKGROUND OF THE INVENTION

This invention relates to a glass container, and particularly relates to a glass container with a handle such as, for example, a blender jar.

A blender is used to blend food ingredients into a desired state and consistency. The blender typically includes a housing with a motor for driving a blending implement usually at the inner base of a blender jar or container. The jar is typically removable from the housing of the blender to facilitate transport of the jar to and from another station independently of the housing.

There are many styles and designs of blender jars available in the marketplace. One type of jar is composed of glass and includes a slender glass handle which is formed integrally with a glass container portion of the jar. While a glass handle is usually firmly formed with the container portion of the jar, the slender handle is, at times, difficult to grasp and has a tendency to slip from the grasp of a user, particularly due to the smooth surface texture of the glass handle.

As a consequence, there is a need for a glass jar which includes a handle firmly attached to the container portion of the jar which is easy to grasp. There is also a need for a handle including structure which accommodates a strong and full grasp by a user of the glass jar. Further, there is a need for a handle which includes a gripping surface over at least a portion thereof which enhances the users ability to firmly hold the jar without concern for the jar handle slipping from the user's grasp.

SUMMARY OF THE INVENTION

Therefore, it is an object of this invention to provide a glass container having facility for the handling thereof without concern of the container slipping from the grasp of a user thereof.

Another object of this invention is to provide a glass container having a handle which is firmly attached to a container portion thereof to facilitate transport handling of the container.

Further, it is an object of this invention to provide a glass container having a handle with a structure which accommodates a full and strong grip of the handle by a user of the container.

With these and other objects in mind, this invention contemplates a glass container which includes a container portion formed with a side wall, a base floor at a first end and an opening at a second end. A handle support is formed integrally with the container portion along the side wall thereof. A handle cover is located over the handle support. The handle support and the handle cover form a handle.

This invention further contemplates a glass container with a handle cover having a non-slip surface over at least a portion thereof.

Other objects, features and advantages of the present invention will become more fully apparent from the following detailed description of the preferred embodiment, the appended claims and the accompanying drawings.

DETAILED DESCRIPTION OF THE PREFERRED EMBODIMENT OF THE INVENTION

Figure 1:
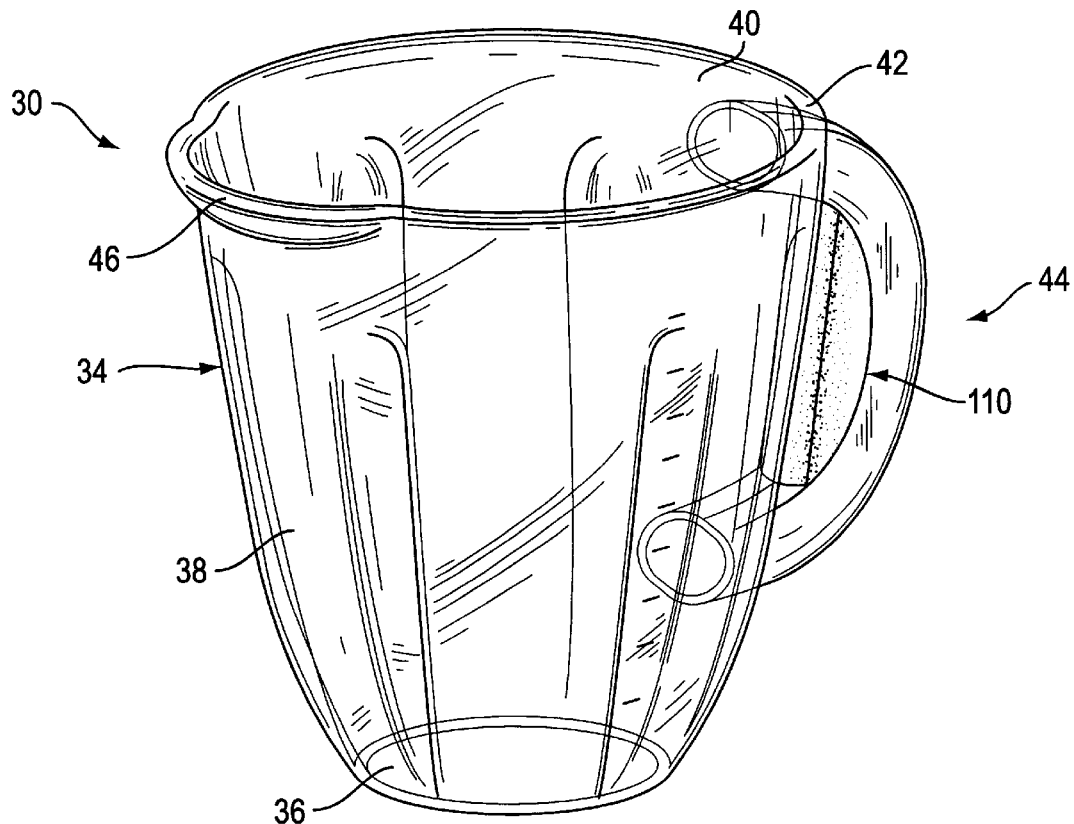
FIG. 1 is a perspective view showing a glass container with a handle in accordance with certain principles of the invention.

Referring to FIG. 1, a glass container or jar 30 is formed with a container portion 34 having a base floor 36, a side wall 38 and an opening 40 at a top edge 42 thereof. The container 30 also includes a handle 44 attached to outer portions of the side wall 38, and a pouring lip 46 formed at the top edge 42 contiguous with the opening 40 thereof. The base floor 36 is circular at a prescribed diameter, and the top edge 42 is also circular, except for the lip 46, at a diameter greater than the prescribed diameter. The side wall 38 extends from the base floor 36 to the top edge 42 of the container 30 and flares radially outward therebetween.

Figure 2:
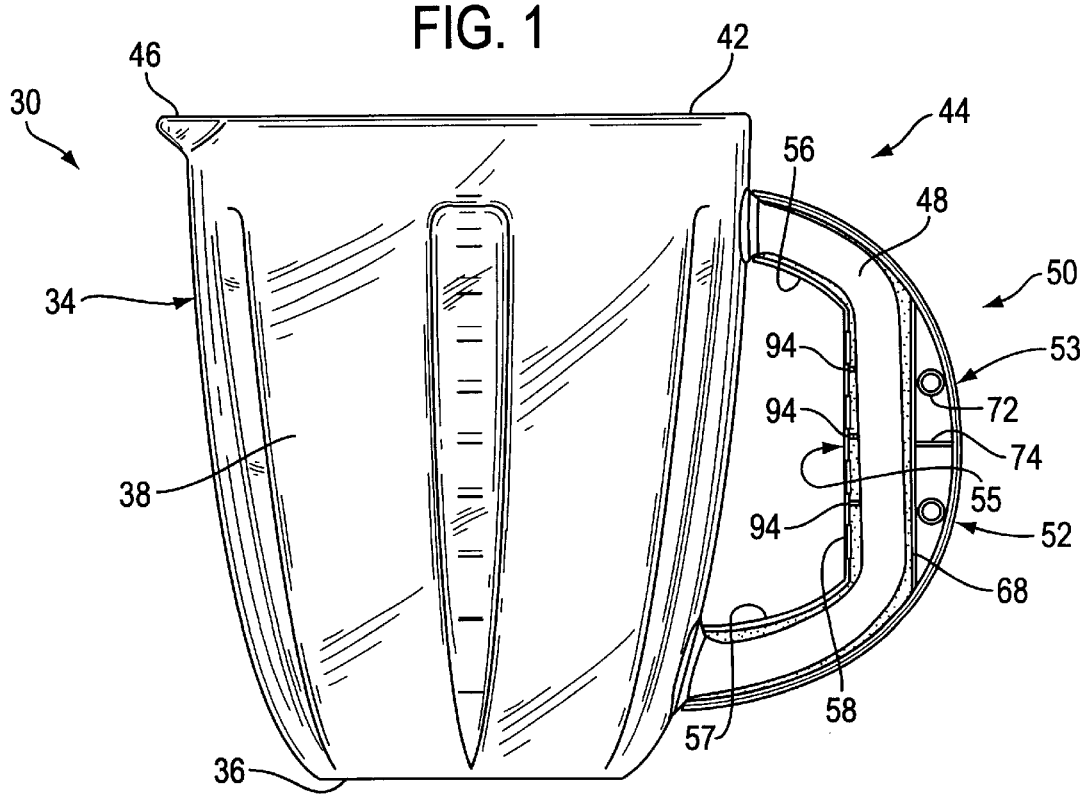
FIG. 2 is a side view showing the container and handle of FIG. 1 with portions of the handle removed to show elements thereof in accordance with certain principles of the invention.
Figure 3:
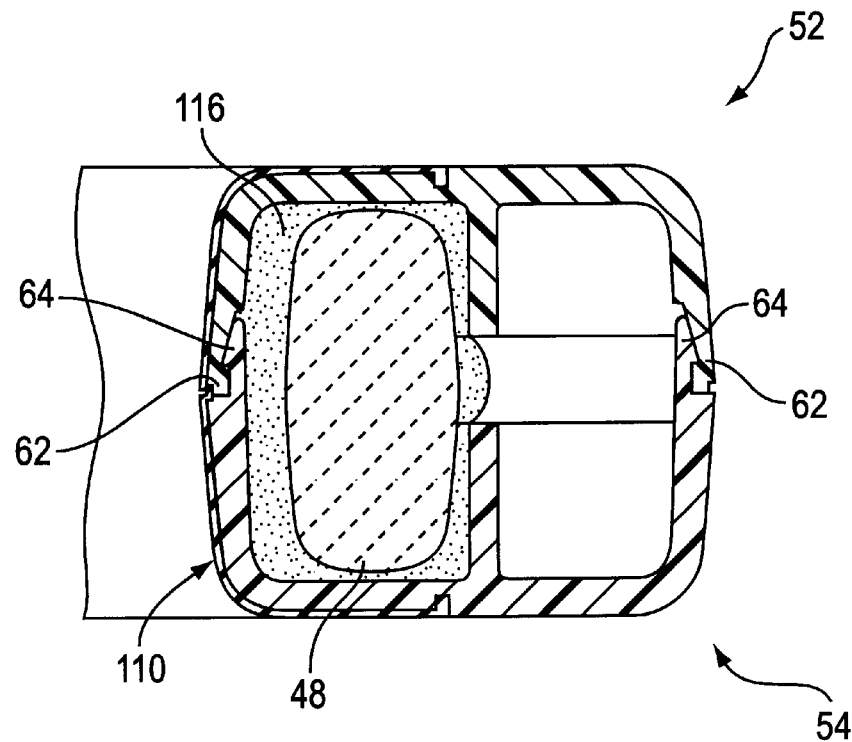
FIG. 3 is a sectional view of a portion of the handle of FIG. 1 showing interior features of the handle in accordance with certain principles of the invention.
Figure 4:
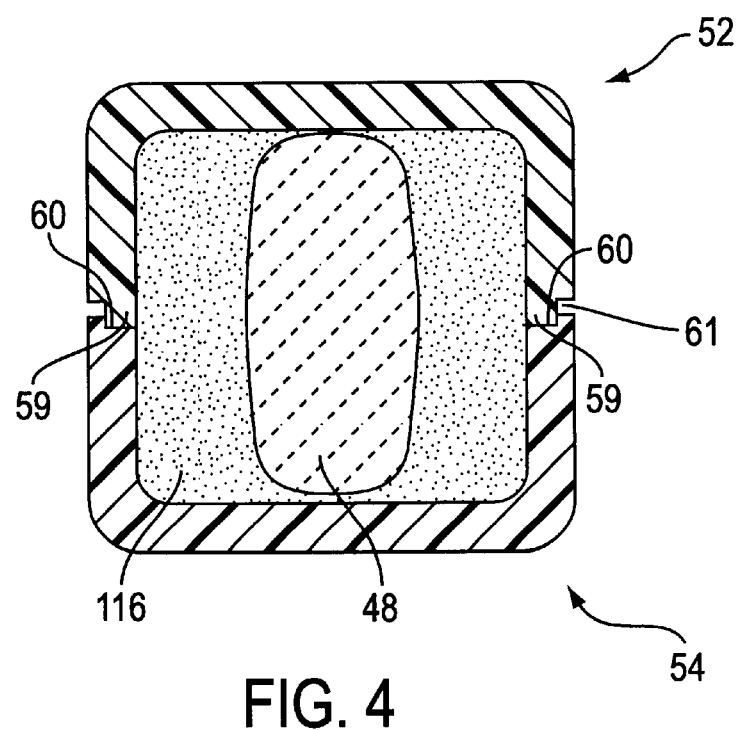
FIG. 4 is a sectional view of another portion of the handle of FIG. 1 showing interior features of the handle in accordance with certain principles of the invention.
Figure 5:
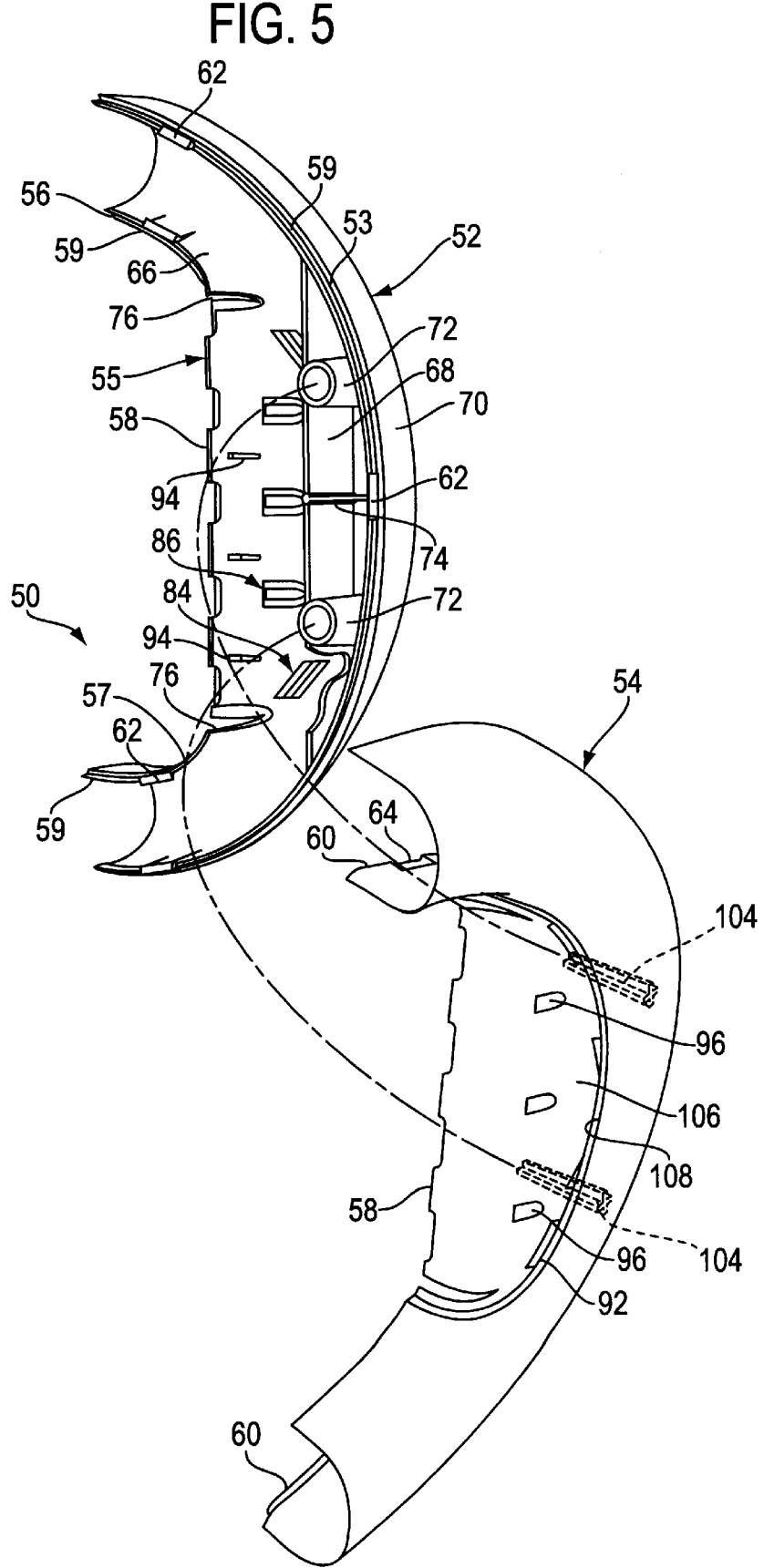
FIG. 5 is an exploded perspective view showing two sections of a cover for the handle of FIG. 1 in accordance with certain principles of the invention.

As shown in FIG. 2, the handle 44 of the container 30 includes an interior support 48, which is composed of glass and is integrally formed with vertically spaced portions of the exterior of the side wall 38 in a generally curved configuration. The handle 44 further includes a cover 50 composed of two half shell sections 52 and 54 as illustrated in FIG. 5. As shown in FIGS. 2, 3 and 4, the sections 52 and 54 are formed in a curving end-to-end configuration which generally follows the curvature of, and is structured to fit about, the glass support 48. The sections 52 and 54 are composed of a durable plastic material such as, for example, polycarbonate.

It is noted that the section 54 is formed with structural features essentially the same as the structural features of the section 52 except where specific differences are noted below. The common features of the sections 52 and 54 will be described with respect to the section 52, it being understood that the section 54 also includes the common features.

As shown in FIG. 4, each of the sections 52 and 54 is formed generally with a "U" shaped cross section taken laterally along its length. As shown in FIG. 2, the section 52 is formed with a concave outboard edge 53, and an inboard edge 55 which is formed by two curved portions 56 and 57 at opposite ends of a straight intermediate portion 58. The straight intermediate portion 58 is formed in the manner of a chord extending across a circular portion, represented by the curved portions 56 and 57. Referring to FIG. 4, stepped rims 59 are formed along the edge 53 and along the curved portions 56 and 57 of the section 52, while the section 54 is formed with inboard stepped grooves 60 along corresponding edges thereof in a shape complementary to the shape of the rims 59. When the sections 52 and 54 are assembled about the glass support 48, the rims 59 will locate in the grooves 60 to conceal the actual interfacing juncture of the sections and form an attractive seam 61. Referring to FIG. 3, the sections 52 and 54 are also formed with a plurality of biased snap fingers 62 and 64, respectively, which are spatially located along the respective edges thereof to interlock when the sections are assembled together about the glass support 48 to thereby latch the sections together and form the cover 50.

Figure 6:
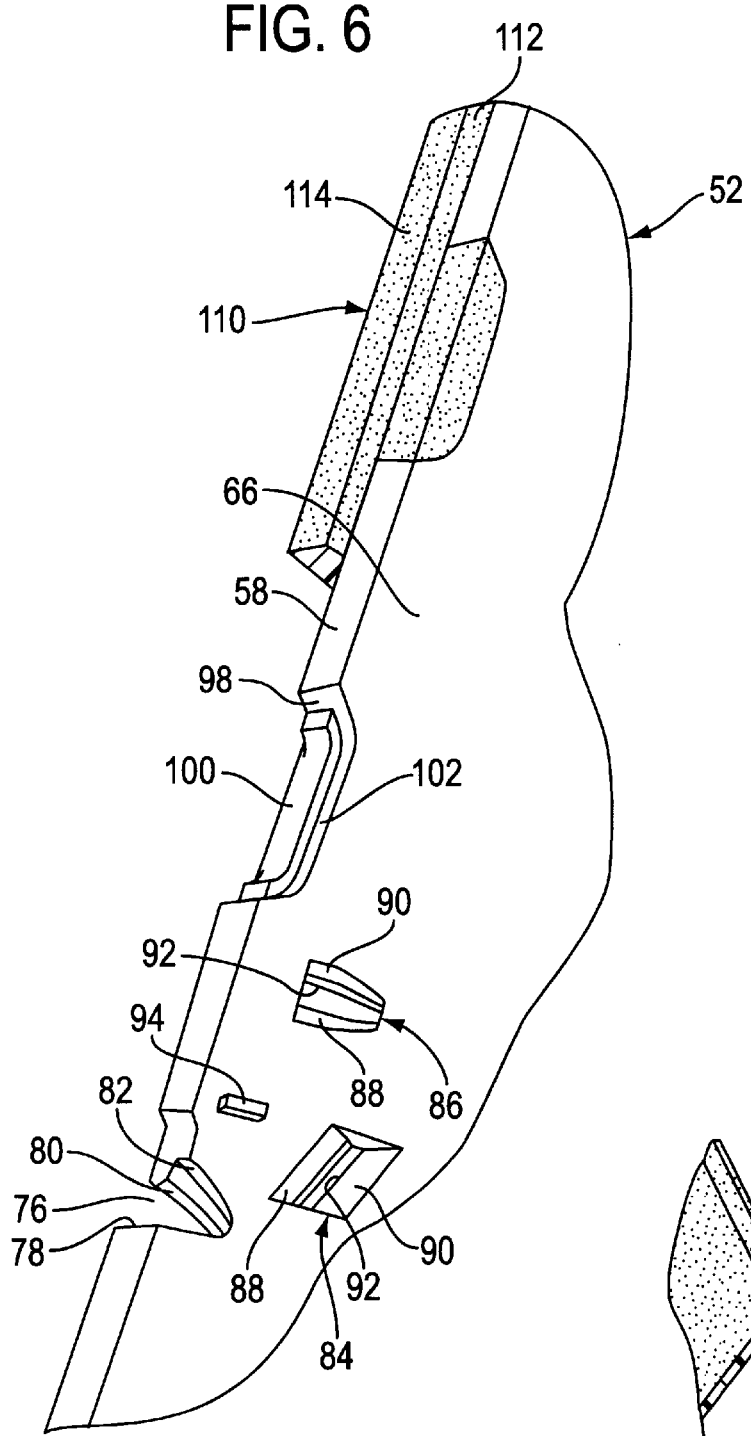
FIG. 6 is a perspective view showing a portion of an edge of one of the cover sections of FIG. 5 in accordance with certain principles of the invention.

As shown in FIG. 5, the half section 52 is formed with an open channel 66, with a separator wall 68 formed across a central chord segment 70 of the section, on an inboard side of a pair of spaced cylindrical stacks 72 which extend outward from the base of the channel. A side wall 74 extends between the separator wall 68 and the chord segment 70 which separates the stacks 72. An inside portion of the section 52 is formed with a pair of "V" shaped openings 76, one of which is shown enlarged in FIG. 6 and is formed by two spaced surfaces 78 and 80, with an inboard notch 82 formed in the surface 80. Further, as shown in FIG. 5, the section 52 is formed with a plurality of troughs 84 and 86, each of which, as shown in FIG. 6, include a pair of spaced sloping surfaces 88 and 90 on opposite sides of a through hole 92 formed through the section 52. The through holes 92 communicate with windows 96 formed in the outer surfaces of the sections 52 and 54, as illustrated with respect to the section 54.

A plurality of thin ribs 94 are formed on the inboard wall of the section 52 and, as further shown in FIG. 2, provide an inboard locator for a straight intermediate portion of the glass support 48. The ribs 94 extend from the adjoining wall of the section 52 at successively greater distances, with the uppermost rib as viewed in FIG. 2 extending the least distance and the lowermost rib extending the greatest distance. The successively greater distances accommodate a slight outward flare of the intermediate portion of the glass support 48 as the portion extends from the top to the bottom thereof.

As shown in FIGS. 5 and 6, the straight edge portion 58 is formed with a plurality of spaced notches 98, each having a raised platform 100 toward the outboard surface of the section 52 and a recessed ledge 102 on the inboard side of the platform. Referring to FIG. 5, the section 54 is formed with a pair of spaced posts 104 which extend outward from a channel thereof, and are located to be inserted into the stacks 72 of the section 52 when the sections are assembled together. Also, as shown with respect to the section 54, each of the sections 52 and 54 are formed with a recessed outer surface 106 bordered by the straight edge portion 58 and an intermediate curved shoulder 108.

Figure 7:
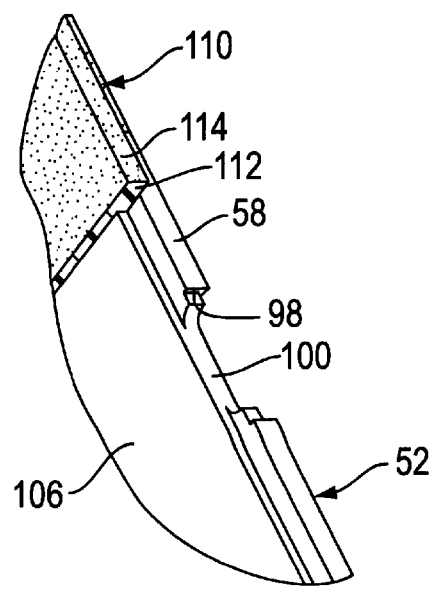
FIG. 7 is a perspective view showing an opposite side of the edge of the one cover section of FIG. 6 in accordance with certain principles of the invention.

Referring to FIGS. 6 and 7, the section 52 is placed in a mold which forms a cavity about the recessed surface 106 and along the straight edge portion 58. A plastic, in a liquid state, is deposited into the cavity and flows onto the recessed surface 106, through the "V" shaped openings 75, the openings 92 of the troughs 84 and 86, and over the platform 100 of the notches 98. The plastic then flows onto the notches 82, the sloping surfaces 88 and 90, and the ledges 102. When the plastic is cured, it forms an attachment 110 generally outboard of the recessed surface 106 and is retained with the section 52 by the portions of the plastic which flowed onto the notches 82, the sloping surfaces 88 and 90, and the ledge 102. A plastic noted for its non-slip properties and identified as "ALLRYN," which is available from DuPont, can be used to form the attachment 110. During the molding process, the surface melt between the polycarbonate sections 52 and 54 and the liquid plastic which forms the attachments 110 develops a bonding therebetween which enhances the retention of the covers to the sections. The formed attachments 110 provide an excellent soft-type, non-slip, handle grip which has a long life cycle.

As shown in FIGS. 6 and 7, the cavity of the mold facilitates the formation of a portion 112 of the attachment 110 which extends above the straight edge portion 58, and which is formed with an outer edge 114. When the sections 52 and 54 are assembled together, the edges 114 of the attachments 110 firmly engage to form a near-seamless juncture.

Referring to FIGS. 2 and 3, prior to assembling the sections 52 and 54 together, a silicone adhesive is deposited into portions of each of the shells 66 which will come into contact with the glass support 48, and other elements of the sections if desired. After the sections 52 and 54 have been assembled, the silicone adhesive will cure and form a cured adhesive 116 which further locks the cover about, and to, the glass support 48, and thereby with the container portion 34 to form the container 30.

As described above, the container 30 includes a glass container portion 34 and a handle 44. The handle 44 is securely and firmly attached to the container portion 34 and includes the non-slip attachment 110. The container 30, with these features, is easy to grasp and transport without concern for slipping from the grasp of the user.

In general, the above-identified embodiments are not to be construed as limiting the breadth of the present invention. Modifications, and other alternative constructions, will be apparent which are within the spirit and scope of the invention as defined in the appended claims.

What is claimed is:

1. A glass container, which comprises:
   a container portion formed with a side wall, a base floor at a first end and an opening at a second end;
   a handle support having a generally curved configuration formed integrally with the container portion along the side wall thereof;
   a handle cover located over the handle support, said cover comprising a pair of half shells, each of which follow the curvature of said handle support, each shell having a generally U-shaped cross section taken laterally along the length of the shell;
   the handle support and the handle cover forming a handle; and
   a cured adhesive located between said half shells of said handle cover and said handle support for adhesively locking said cover about and to said glass support.

2. The glass container as set forth in claim 1, which further comprises:
   a non-slip cover attached to at least a portion of the handle cover.

3. The glass container as set forth in claim 1, which further comprises:
   at least one rib formed internally of the handle cover for locating the handle support in a prescribed location within the handle cover.

4. A glass container, which comprises;
   a container portion;
   a handle support formed with the container portion;
   a handle cover enclosing the handle support;
   a non-slip cover self-secured to at least portions of the handle cover;

said cover formed with a wall having an outer surface and an inner surface;

the wall having at least one opening extending therethrough; and the non-slip cover formed with portions over the outer surface of the wall, with portions through the opening of the wall, and with portions over the inner surface, whereby the non-slip cover is self-secured to the handle.

5. The glass container as set forth in claim 4, which further comprises:

the handle cover being formed in two sections;

each of the two sections of the handle cover being formed with structure which is complementary with structure of the other of the two sections;

the structure of each of the two sections being assembled with the structure of the other of the two sections; and a cured adhesive located between at least portions of the assembled structures of the two sections to assist in securing the sections together.

6. The glass container as set forth in claim 4, which further comprises:

at least one rib formed internally of the handle cover for locating the handle support in a prescribed location within the handle cover.

7. The glass container as set forth in claim 4, which further comprises:

the portion of the inner surface of the wall, which is contiguous with the opening of the wall, being recessed from the adjacent portions of the inner surface.

8. A glass container, which comprises:

a container portion;

a handle support formed with the container portion;

a handle cover enclosing the handle support;

a non-slip cover self-secured to at least portions of the handle cover;

a handle cover formed with a wall having an outer surface, an inner surface and an edge portion extending between the outer and inner surfaces;

a notch formed in the edge portion of the wall;

a ledge formed in the notch with a prescribed width and extending between the outer and inner surfaces of the wall;

a platform formed as a raised surface above and on the ledge;

the platform having a width less than the prescribed width and having a side wall adjacent to the outer surface of the wall; and the non-slip cover formed with portions over the outer surface of the wall, with portions over the platform and with portions onto the ledge whereby the non-slip cover is self-secured to the handle cover.

9. The glass container as set forth in claim 8, which further comprises:

the handle cover being formed in two sections;

each of the two sections of the handle cover being formed with structure which is complementary with structure of the other of the two sections;

the structure of each of the two sections being assembled with the structure of the other of the two sections; and a cured adhesive located between at least portions of the assembled structures of the two sections to assist in securing the sections together.

* * * * *